United States Patent [19]

de Buhr et al.

[11] 3,982,164

[45] Sept. 21, 1976

[54] LOCOMOTIVE WHEEL SLIP CONTROL

[75] Inventors: Alfred P. de Buhr, Downers Grove; Bruce R. Meyer, Western Springs, both of Ill.

[73] Assignee: General Motors Corporation, Detroit, Mich.

[22] Filed: Dec. 18, 1974

[21] Appl. No.: 534,078

[52] U.S. Cl. .................... 318/52
[51] Int. Cl.[2] .................... H02P 5/50
[58] Field of Search .................... 318/52

[56] References Cited

UNITED STATES PATENTS

| | | | |
|---|---|---|---|
| 3,614,173 | 10/1971 | Branson | 318/52 X |
| 3,614,564 | 10/1971 | Hirotsu | 318/52 |
| 3,728,596 | 4/1973 | Hermansson | 318/52 |
| 3,790,871 | 2/1974 | Smith | 318/52 |
| 3,832,609 | 8/1974 | Barrett | 318/52 |

*Primary Examiner*—B. Dobeck
*Attorney, Agent, or Firm*—Warren D. Hill

[57] ABSTRACT

A method and apparatus are disclosed for controlling the wheel slip of an electric or diesel electric locomotive such that optimum wheel adhesion may be attained. A certain characteristic of a series traction motor, specifically the back emf per rpm versus motor current (E/n vs. I), forms the basis for a voltage control which limits the voltage (V) supply to each motor to a value which will limit the maximum percentage wheel slip. The selected limit value of wheel slip is great enough to encompass the conditions of maximum adhesion under most rail conditions. By combining the E/n with the motor IR drop, motor current, and a locomotive speed signal, the idealized voltage V for a non-slip condition is derived. This voltage is increased by a factor representing the desired maximum percentage slip to obtain the limiting voltage which may be supplied to the motor. A current maximizing circuit is included to decrease the allowed percent slip from the maximum preselected value to a value which provides the maximum motor current to obtain maximum traction.

5 Claims, 8 Drawing Figures

LOCOMOTIVE WHEEL SLIP CONTROL

This invention relates to an apparatus for controlling wheel slip in an electric locomotive and particularly to such an apparatus for allowing sufficient wheel slippage to obtain the benefits of high rail adhesion which occurs during wheel slip.

Electric locomotives which are powered by on-board or by right of way power supplies are called electric locomotives herein.

It is conventional practice to limit the maximum slip allowed on electric locomotives to a very low value. Any wheel slip beyond the limit value has been considered to be excessive and undesirable. Generally, wheel slip control is carried out by detecting excessive wheel slip whenever it occurs (for example by comparison of motor currents) and taking corrective action by reducing power supplied to the traction motors until the wheel slip returns to a value below the low established limit. It has been found that as wheel slip increases, the rail adhesion or friction between the wheel and rail also usually increases up to some peak value and then the adhesion decreases with further increase of slip. Thus to obtain optimum tractive effort by the locomotive, particularly during drag service, it is desirable to allow the wheels to slip sufficiently to attain the maximum adhesion value. The traditional wheel slip limit is substantially lower than that which provides maximum adhesion. It is then desirable to provide an apparatus for controlling the wheel slip in a manner to allow the maximum adhesion to be attained.

It is therefore a general object of this invention to provide an apparatus for controlling wheel slip in an electric locomotive in a manner which allows the wheels to attain maximum rail adhesion.

It is a further object of the invention to provide a wheel slip control circuit for an electric locomotive which limits the maximum percent wheel slip and yet allows sufficient slippage for the wheels to obtain maximum adhesion.

It is another object of the invention to provide in such a wheel slip control circuit for several motors a motor current maximizing circuit operating within the allowable maximum percent slip to decrease the slip limit when appropriate for increasing the combined motor currents and therefore total motor torque.

The invention is carried out by providing circuits which develop signals corresponding to motor current and non-slipping motor speed, a calculating circuit responsive to those signals for determining a limit voltage, and a control for limiting the maximum voltage supplied to the motor at the value of the limit voltage for establishing the maximum wheel slip for the wheels driven by the motor, wherein the calculating circuit utilizes a preprogrammed function $E/n$ vs. $I$ where $E$ is the back emf of the motor, $n$ is motor speed and $I$ is motor current. In particular, the calculating circuit solves the equation $V=E+IR$ where $R$ is motor resistance to establish the motor voltage $V$ for a non-slipping motor and includes a circuit for increasing $V$ by an amount representing the maximum desired slip.

The invention further contemplates a current maximizing circuit responsive to motor current and having the effect of varying the calculated limit voltage in a manner to maximize the motor current.

The above and other advantages will be made more apparent from the following specification taken in conjunction with the accompanying drawings wherein like reference numerals refer to like parts and wherein.

Figure 1:
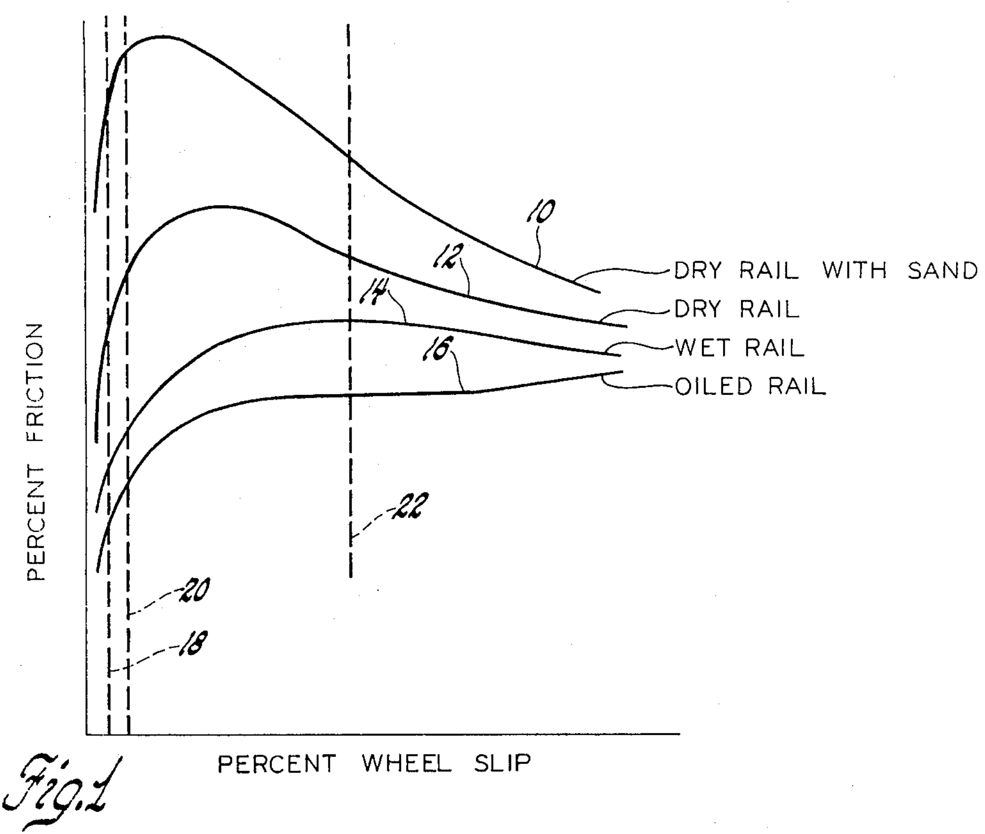
FIG. 1 is a diagram illustrating the relationship between friction and percent wheel slip of a locomotive wheel on a rail.

FIG. 1 is a diagram showing the variation of percent friction or adhesion between locomotive wheels and the rail versus percent wheel slip. Curves 10, 12, 14 and 16 represent that relationship for a dry rail with stand, a dry rail, a wet rail and an oiled rail respectively. These quantitative comparisons reveal that at low wheel slip values, the percent of friction increases as wheel slip increases and, for most rail conditions, the adhesion or friction reaches a peak and then declines with increase in wheel slip. It is notable that in curves 10, 12 and 14, the peaks occur at substantially different slip percentages. In the case of the oiled rail, the adhesion increases with wheel slip. Traditionally, electric locomotives are provided with wheel slip detectors and correction devices that are intended to maintain the wheel slip at a very low percentage (about ½ to 1½%) between the vertical lines 18 and 20. Thus a locomotive so equipped will allow wheel slip to occur until it reaches, say, line 18, and if the slip exceeds that value it is detected and then temporarily corrected until it occurs again. Nominally, the slip is limited to such a low percentage that the maximum rail adhesion values occurring at the peaks of the curves are not realized, thereby restricting the tractive effort of the locomotive to a value much below that which the rail adhesion would allow.

The present invention is intended to allow sufficient percentage wheel slip to occur so that the wheel may be free to operate at the peak adhesion value for each particular rail condition and to limit the percent wheel slip to a maximum value, say 10 or 15%, at line 22 at the righthand side of the peaks of the curves 10 and 12, all without actually detecting slip in the traditional sense. Rather the control is carried out in a manner to so limit the motor voltage that a greater percentage slip cannot be sustained.

Figure 2:
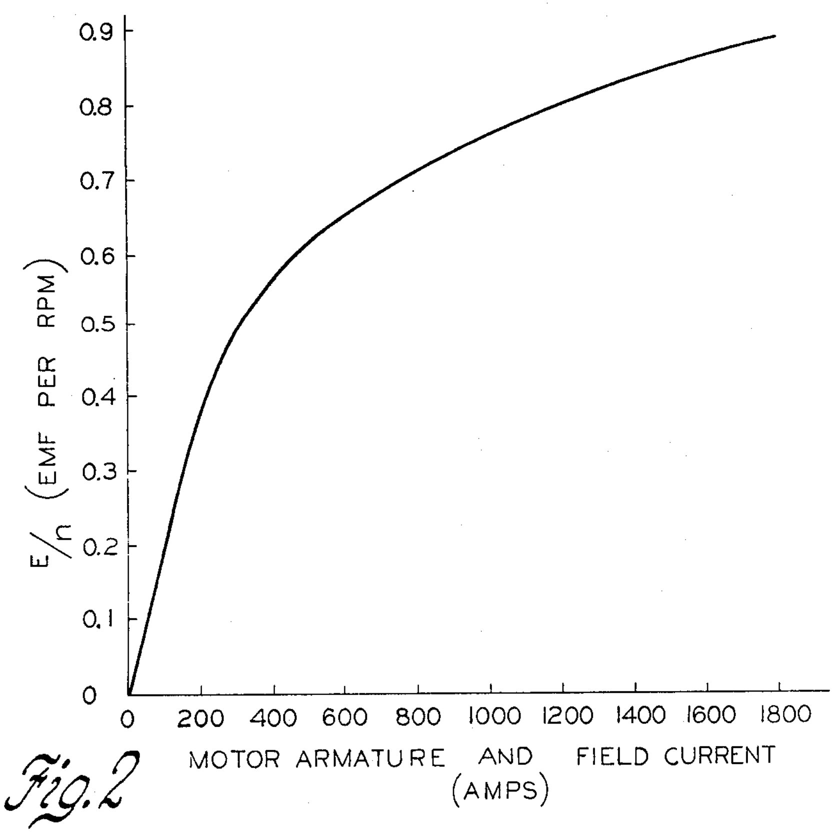
FIG. 2 is a curve illustrating the series motor characteristic, back emf per rpm versus motor current.

The control is based on the back emf per rpm versus motor current (E/n vs. I) characteristic of a series motor. The curve of FIG. 2 depicts such a characteristic for one specific type of full field non-shunted motor. If the field current is shunted or if the motor current is separately excited, there is a separate E/n curve for each degree of shunt or field current. For the control described herein, the locomotive will utilize full field series motors connected in parallel. If the motor speed and motor current are known, the back emf developed by the nominal traction motor can be calculated using the E/n curve. Using the back emf or E developed from the E/n curve and the basic motor equation $V=E+IR$ $+ V_b$; where $V$ is the total motor voltage, $R$ is the total motor resistance and $V_b$ is the brush drop; a series of miles per hour motor curves can be developed for a nominal full field motor. (Since the value of $V_b$ is nominal, it may be ignored in the computation.) By controlling the motor voltage along one of the mph motor curves, the particular motor is limited to that maximum speed regardless of the motor current or motor load.

Figure 3:
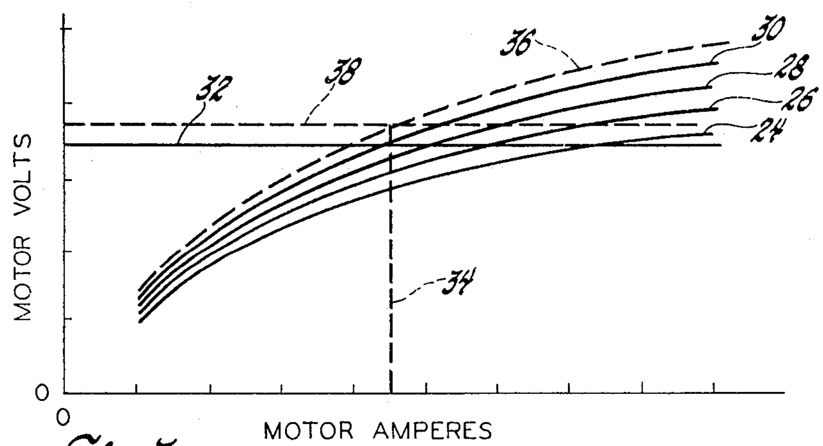
FIG. 3 is a diagram illustrating motor curves at a constant locomotive speed.

The diagram of FIG. 3 shows a plot of motor volts versus motor current for four motors A, B, C and D on curves 24, 26, 28 and 30 respectively, for one specific locomotive speed at one instant in time. Four different motor curves are shown because wheel size differences result in different motor speeds and because manufacturing tolerances result in slightly different E/n characteristics. Even though some difference in tolerances exist among the four motors, any axle can be limited to a certain maximum percent controlled slip speed. The motor voltage applied to all the motors is shown by the horizontal line 32. Thus the current of each motor is at the point where the respective motor curve intersects the line 32. The lowest motor current (the current of motor D) is shown at line 34. Above the four motor curves is a dashed control curve 36 for this particular instant and locomotive speed. The control curve represents a motor curve at a higher speed than any of the non-slipping motors. If any one of the wheels driven by these motors starts to slip while the train speed is still constant, that particular motor speed curve moves up to the left. By limiting along the voltage established by the dashed control curve 36 and the lowest motor current, any of the axles are prevented from slipping any higher than a speed represented by that dashed control line so that a maximum slip speed control for all axles is established, although the actual slip speed in mph is different for each axle. By using the lowest motor current to limit the main generator voltage to the dashed control curve 36, any motor which slips is speed limited along the limit voltage shown by line 38 which is set by the lowest motor current, and by the dashed control line 36 after the slipping motor's current becomes the lowest motor current. In other words, the control system establishes a limit voltage 38 based on the lowest motor current 34 and the control line 36. If then motor A were to slip, the motor curve 24 would tend to shift toward line 36, however, it would not be permitted to exceed line 38 since the available voltage is limited by the control. The decrease in current occurring during slippage will then cause the operating point of motor A to follow the line 38 toward the left until its current becomes lower than the previous lowest current at line 34. Further decreases of motor current for the slipping motor A will cause its operating point then to follow the line 36 to the left which will result in a reduction in voltage of all the motors. As the current of the slipping motor decreases, the motor torque decreases proportionally until a balance is reached between the track adhesion and motor torque. Wherever that occurs, the operating point of motor A will stop its movement toward the left. During actual operation, the control curve 36 will be continually changing as locomotive speed changes and the limit voltage 38 will be changing to follow the lowest motor current.

Figure 4:
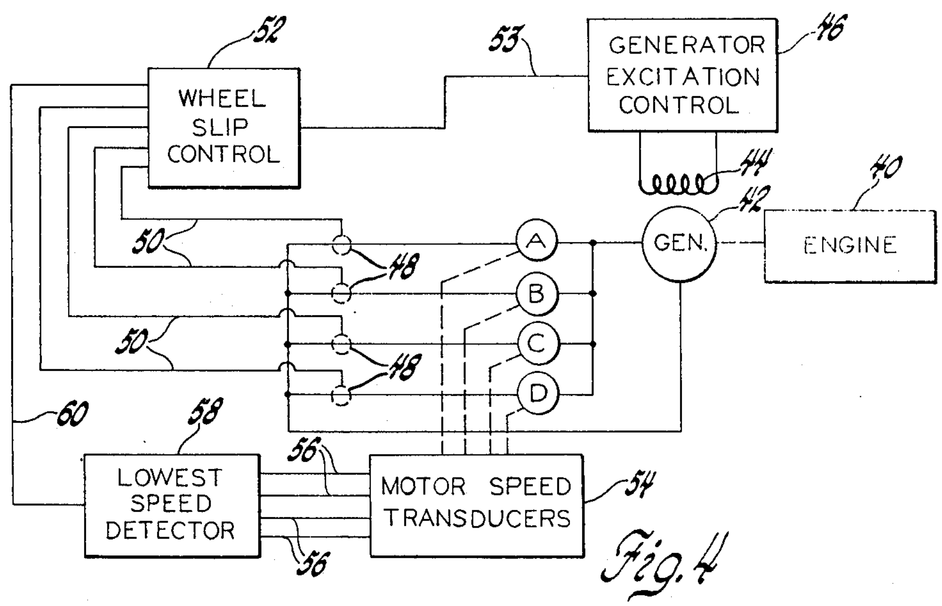
FIG. 4 is a block diagram of a control for a locomotive embodying a wheel slip control according to the invention.

FIG. 4 diagrammatically illustrates a control for a diesel electric locomotive embodying the subject wheel slip control. A diesel engine 40 drives a generator 42 which has a field 44 supplied by a conventional generator excitation control 46 which nominally effects a constant horsepower output of the generator 42. Four series motors A, B, C and D are connected in parallel across the generator, each motor driving an axle of the locomotive. Motor current transducers 48 produce output signals on lines 50 proportional to the current of each motor. The lines 50 are connected to inputs of a wheel slip control 52. The output of the wheel slip control is fed on line 53 to the generator excitation control 46 to place a limitation on the generator voltage during wheel slip conditions. One requirement of the wheel slip control is that it have an input proportional to locomotive speed in order to determine the value n which is the rpm of a non-slipping motor. Several choices are available for the source of locomotive speed signals: radar or laser speed detection may be employed or the speed of an idler wheel may be used if one is present on the locomotive. FIG. 4 shows another scheme of approximating locomotive speed which involves detection of the speed of the slowest traction motor. It is assumed that the slowest of the traction motors is not slipping substantially even though another motor may be slipping to its maximum controlled value. Experience in actual service has shown that his assumption is generally correct and that satisfactory results are obtained. Thus in FIG. 4, motor speed transducers 54, responsive to each individual motor, provide a signal proportional to each motor speed on lines 56. The lowest speed detector 58 detects the lowest signal on lines 56 and supplies that signal on line 60 to an input of the wheel slip control 52.

Figure 5:
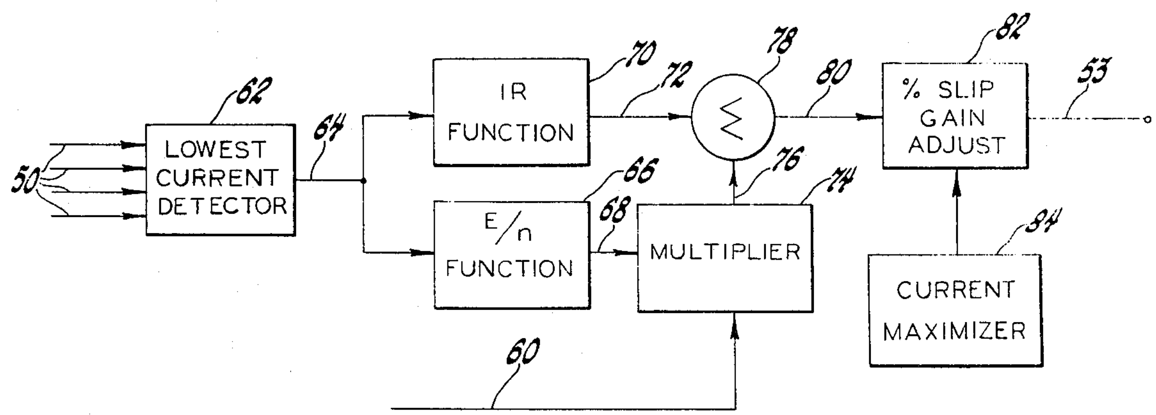
FIG. 5 is a block diagram of the wheel slip control according to the invention.

The wheel slip control 52 is shown as a block diagram in FIG. 5. Lines 50 carrying the motor current signals are fed to a lowest current detector 62 which has an output proportional to the lowest motor current. The lowest current signal is supplied by line 64 to two function blocks. One function block 66 is a function generator which supplies an output signal on line 68 which is proportional to the E/$n$ determined by the lowest current signal and the specific E/$n$ versus I curve programmed into the function generator which curve is empirically determined for the specific type of motor used on the locomotive. The other function block 70 in response to the lowest current signal provides an output signal on line 72 proportional to IR. A simple resistor circuit is adequate to supply the IR signal. The lowest motor speed signal on line 60 representing the signal $n$ as well as the E/$n$ signal on line 68 is fed to a multiplier 74 which provides an E signal on line 76 which is combined at a summer 78 with the IR signal on line 72 to provide signal V on line 80 representing the ideal voltage of a motor operating at locomotive speed and with the current I. A percent slip gain adjust circuit 82 preferably comprising an operational amplifier increases the V signal on line 80 by an amount corresponding to the desired maximum percent wheel slip to provide a limit voltage signal on line 53 to control the generator excitation control 46. A current maximizer circuit 84 described below may optionally be used to adjust the percent slip allowed by the circuit 82 to increase the combined motor torque.

Figure 6:
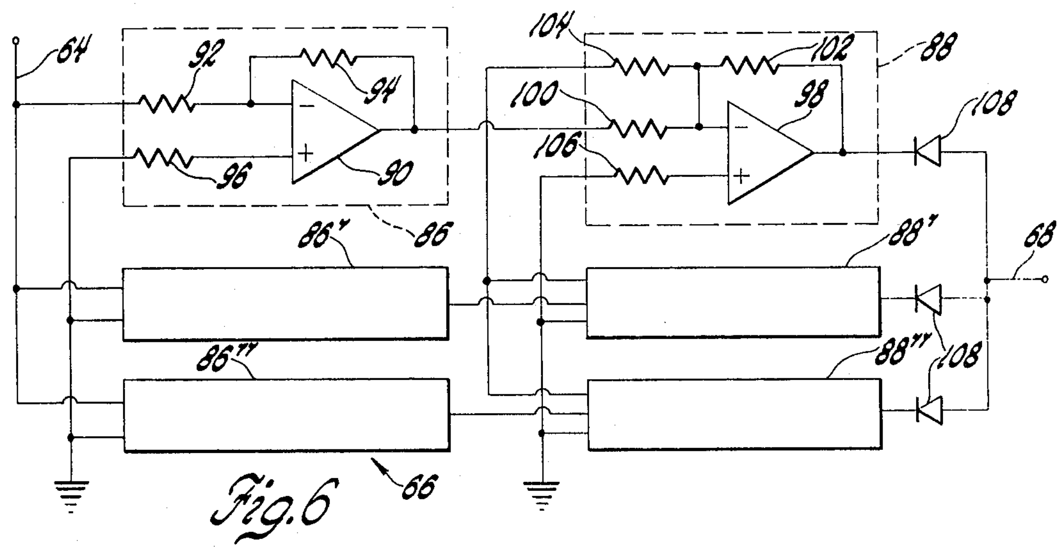
FIG. 6 is a schematic circuit diagram of the E/n function generator of FIG. 5.

The E/$n$ function generator 66 is set forth in FIG. 6 and comprises a number of stages each of which generates a straight line approximating some portion of the E/$n$ curve shown in FIG. 2, and a diode selector for selecting the lowest voltage of the several produced. The first stage of the function generator 66 includes a slop control unit 86 and an offset unit 88. The slope control unit 86 includes an operational amplifier 90 having its negative input terminal connected through a resistor 92 to line 64 and connected through a feedback resistor 94 to the amplifier output. The positive input terminal is connected through a resistor 96 to ground. The offset unit 88 includes an operational amplifier 98 having its negative input terminal connected through a resistor 100 to the output of the amplifier 90, through a feedback resistor 102 to the output of amplifier 98, and through a resistor 104 to a source of −15 volts. The positive input terminal is connected through a resistor 106 to ground. The slope control unit 86 has a gain selected to approximate one portion of the E/*n* versus I curve so that its output will be a signal which is a linear function of the lowest current signal on line 64. The amplifier in the offset unit 88 has utility gain and by virtue of the bias signals supplied through resistor 104 an offset voltage is superimposed on the output of the slope control unit. Succeeding stages of the E/*n* function generator include slop control units 86′ and 86″ and offset units 88′ and 88″ which are identical to those in the first stage except for resistor values which are selected to provide an output signal appropriate to the portion of the curve to be simulated. More than three stages may be utilized: five stages have been found to provide acceptable reproduction of the E/*n* versus I function. The outputs of the various stages are connected through diodes 108 which permit the lowest voltage generated in the several stages to be passed to the line 68.

The control method as carried out by the illustrated apparatus then involves empirically determining the E/*n* versus I characteristic of the traction motors and programming the function generator 66 to reproduce that characteristic, detecting the lowest current of the several motors by detector 62, deriving the IR and the E/*n* signals by applying the lowest motor current to the function generators 70 and 66, multiplying the E/*n* signal by the signal n representing a non-slipping motor speed via the multiplier 74 to obtain the E signal, and adding the E and IR signals to obtain the V signal representing the voltage of a non-slipping motor. Then that V signal is increased by a desired maximum percent slip factor in circuit 82 to provide a limit voltage signal on line 53. The percent slip gain adjust does not have to be applied to the V signal, but rather it may be applied elsewhere in the computation circuit, e.g. it may be applied to the speed signal on line 60 to obtain a similar but slightly different effect.

Describing the operation of the system with reference to FIG. 1, assume operation on a dry rail so that the curve 12 is primarily applicable. Initially, the generator excitation control 46 is supplying a constant horsepower to the several motors so that as percent wheel slip increases, the percent friction or wheel adhesion increases so that wheel torque or motor torque increases. Motor current increases proportional to torque and the voltage correspondingly decreases to satisfy the constant horsepower requirement. The power of a locomotive is generally balanced so that wheel slip exceeding the friction peak will not occur on a dry rail, however, if some perterbation such as a slippery spot is encountered, the affected axle will momentarily have excessive torque so that the percent wheel slip for that particular axle could quickly increase to surpass the peak of the friction curve and the wheel slip reaches the maximum desired percent slip at line 22. When the sudden slippage occurs and wheel torque diminishes, the motor current diminishes and the motor voltage tends to rise correspondingly. Throughout this procedure, the wheel slip control circuit 52 has been computing the voltage signal on line 53, however, that limit voltage has had no effect on the motor operation until the motor voltage reaches the value of the limit voltage signal which occurred when the wheel slip reached its desired maximum value at line 22. That value, with reference to FIG. 3, is at the limit voltage line 38 if the current of the slipping motor is above the lowest motor current; or it is at the voltage of line 36 if the slipping motor current is the lowest motor current. The operating point of the slipping axle will then oscillate about line 22.

Figure 7:
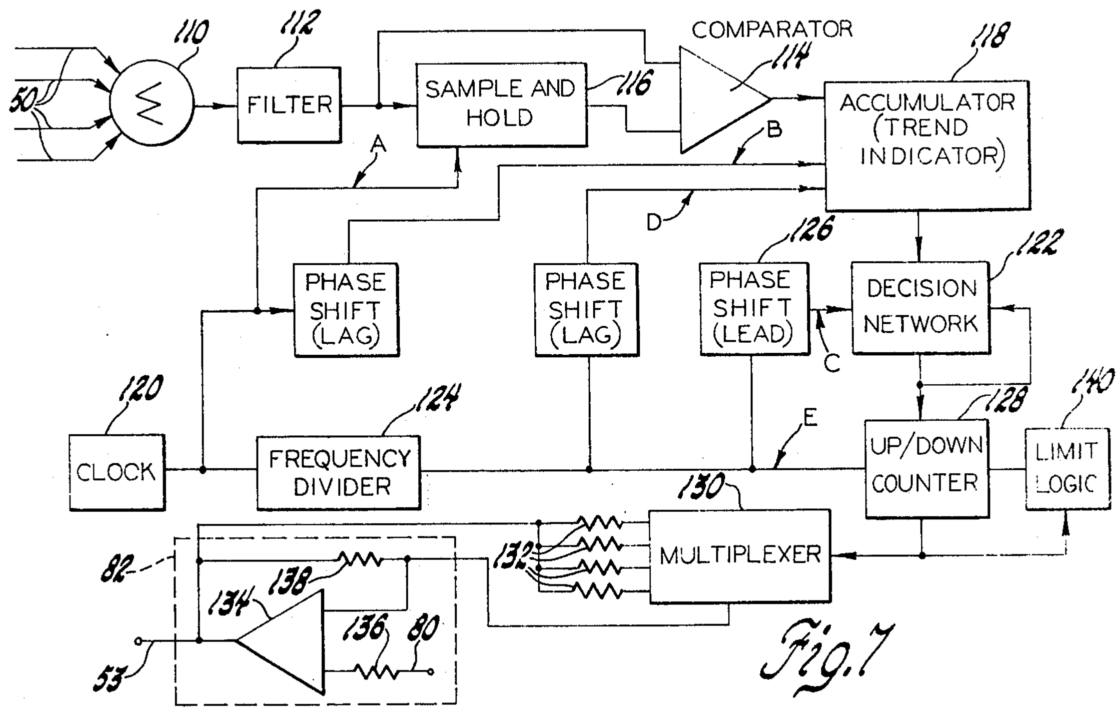
FIG. 7 is a block diagram of the current maximizer of FIG. 5.
Figure 8:
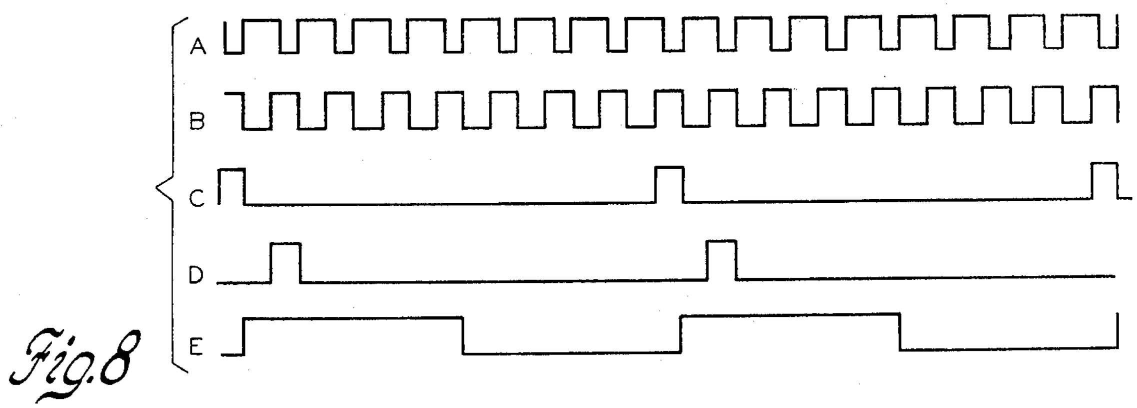
FIG. 8 illustrates a series of pulse trains utilized in the operation of the current maximizer of FIG. 7.

To further improve wheel slip control, the circuit may be modified to vary the limit voltage to maximize the combined traction of the motors. The draw bar pull of the locomotive is proportional to the sum of the motor torques and hence to the sum of the motor currents. The maximum combined torque value can be attained by maximizing the combined motor currents within the limit of the maximum percent slip established by the control. FIG. 7 shows a block diagram of the current maximizer 84 as well as a schematic diagram of the percent slip gain adjust circuit 82. The individual motor current signals on line 50 are combined in a summer 110. The current sum is filtered by filter 112 and is fed to one input of a comparator 114. The total current signal is also supplied to a sample and hold circuit 116 which has its output connected to the other input of the comparator 114. The comparator output is connected to an accumulator 118 which comprises an up/down counter. As shown in FIG. 8, pulses A from a clock 120 periodically trigger the sample and hold circuit to register a new value and pulses B which lag the pulses A trigger the accumulator to register the output of the comparator 114 which has a logic "1" output if the value of the combined current signal has increased during the period from the rising pulse A to the rising pulse B and a logic "0" value if the current value has decreased in that short time period. The accumulator 118 algebraically combines the comparator outputs for eight periods to establish a trend of current change. A decision network 122 has a logic circuit which is triggered by pulse C which is derived from the clock pulses by a frequency divider 124 and a phase shift element 126. After eight A pulses, the decision network is enabled by the pulse C to respond to the trend of the accumulator. After that reading, a pulse D resets the accumulator to begin a new trend measurement. Also after pulse C, an up/down counter 128 is enabled by a rising pulse E to register the output of the decision network and to produce an output signal to a multiplexer 130 which selectively places resistors 132 in the circuit with the percent gain adjust circuit 82. The circuit 82 comprises an operational amplifier 134 connected through an input resistor 136 to line 80 carrying the V signal. An output on line 53 represents the limit voltage signal. A feedback resistor 138 across amplifier 134 establishes the amplifier gain which therefore nominally selects the maximum percent slip. The current maximizer circuit then can alter the maximum percent slip by selectively switching resistors 132 into parallel with feedback resistor 138 to lower the amplifier gain. After such a change in gain has been accomplished, the accumulator 118 output eventually indicates the result of that gain change, if the combined motor current increases, the decision network output remains the same so that the counter 128 steps again in the same direction as during the previous interval to change the feedback resistance of the circuit 82 in the same direction, thereby attempting to cause a further increase in combined motor current. If, however, the combined current decreases, this will be reflected in the accumulator trend and the decision network 122 will produce an output directing, through counter 128, a change in the opposite direction of the amplifier gain. Thus in effect, the maximum percent slip is constantly being varied in search of the value which will maximize the combined motor currents. The limit logic circuit 140 merely limits the range of the outputs of the counter 128 consistent with the number of available resistors 132 at the output of the multiplexer. This current maximizing circuit is described in detail in the copending application Ser. No. 534,077 which is incorporated herein by reference.

By applying the described control to limit the maximum voltage to a plurality of series motors connected in parallel, the adhesion characteristics of a slipping wheel are vastly improved over conventional slip detection-correction systems by allowing the slipping wheel to utilize the available rail adhesion which is present only at percentages of slip higher than that allowed traditionally. Moreover, use of the current maximizer then allows the total locomotive draw bar pull to be maximized for that particular type of traction motor configuration. This type of control system which limits the maximum slip speed of a series traction motor can be applied to electric locomotives by controlling the main generator excitation or a voltage level through SCR's on an electric locomotive obtaining its power from a right of way power supply. This system can also be used to individually control single series traction motors with a separate system for each motor. Individual SCR's can be provided to control the voltage for each individual motor. These systems of controlling slipping speed can provide a much higher utilization of adhesion in drag service without the necessity of heavy and complex controls required for separately excited motors. The refinement of these systems along with individual SCR controlled motor voltages can provide the ultimate in utilization of available adhesion by operating each motor at the peak of its individual friction-slip curve regardless of adhesion conditions and on an instant by instant basis.

Another advantage of this control system is that it becomes unnecessary to apply sand to the rails everytime the wheels are slipping. Instead of sensing wheel slip and applying sand when that occurs, it is now preferable to detect low adhesion and use that parameter for initiating sanding. Thus by comparing a load regulator signal to a feedback signal determined by generator voltage and current, it is determined when the power output is substantially lower than the value demanded. When that occurs, and the locomotive throttle is in a high range, and the lowest motor current is below a specified value, e.g. 1200 amps, the sand system will be turned on. This avoids the use of sanding where it is unnecessary yet causes sanding when adhesion levels are so poor that sufficient horsepower to pull the train cannot be attained.

The embodiments of the invention in which an exclusive property or privilege is claimed are as follows:

1. A wheel slip control for a locomotive having a power supply and an electrical traction motor driving locomotive wheels subject to slipping for limiting the maximum percent wheel slip comprising means coupled to the motor for providing a current signal I corresponding to the motor current, means for providing a speed signal n corresponding to motor speed for a non-slipping condition of the motor, a function generator connected to respond to said current signal I programmed to produce an output signal as a function of I representing $E/n$ where E is back emf of the motor, and a circuit having as inputs said current signal, said speed signal and said $E/n$ signal operative to calculate and produce from said inputs a limit voltage a programmed amount in excess of $V=E+IR$ where $V$ is the voltage of the motor for a non-slipping condition and $R$ is motor resistance, and the programmed amount in excess of $V$ represents a desired percent slip, and means responsive to said limit voltage for limiting the maximum voltage supplied to the motor to a value corresponding to said limit voltage thereby establishing a maximum percent slip of wheels driven by the motor.

2. A wheel slip control for a locomotive having a power supply and several electrical traction motors driving wheels subject to slipping for limiting the maximum percent wheel slip comprising means coupled to the several motors for providing a current signal I corresponding to the lowest motor current of the several motors, means for providing a speed signal n corresponding to motor speed for a non-slipping condition, a function generator connected to respond to said current signal I programmed for providing an output signal as a function of I representing E/n where E is back emf of the motor, and a circuit having an inputs said current signal, said speed signal and said E/n signal operative to calculate and produce from said inputs a signal V = E + IR where V is the voltage of the motors for a non-slipping condition and R is motor resistance, means for increasing the V signal by a factor representing desired maximum percent slip to obtain a limit voltage, and means responsive to said limit voltage for limiting the maximum voltage supplied to the motors to a value corresponding to said limit voltage thereby establishing a maximum percent slip of wheels driven by the motors.

3. A wheel slip control for a locomotive having a power supply and several electrical traction motors driving wheels subject to slipping for limiting the maximum percent wheel slip comprising means for providing a current signal I corresponding to the lowest motor current of the several motors, means for providing a speed signal n corresponding to motor speed for a non-slipping condition, a function generator responsive to the current signal programmed for providing an output signal representing E/n where E is back emf of the motor, and a circuit for calculating from the current signal, the speed signal and the $E/n$ signal $V=E+IR$ where $V$ is the voltage of the motors for a non-slipping condition and $R$ is motor resistance, means for increasing the V signal by a factor representing desired maximum percent slip to obtain a limit voltage, and means for limiting the maximum voltage supplied to the motors to the value of the limit voltage thereby establishing a maximum percent slip of wheels driven by the motors, and a maximizing circuit responsive to combined motor current of the several motors for modifying the limit voltage to increase the combined motor current to substantially its maximum value within the limit of the desired maximum wheel slip.

4. A wheel slip control for a locomotive having a power supply and several electrical traction motors driving wheels subject to slipping for limiting the maximum percent wheel slip comprising means for providing a current signal I corresponding to the lowest motor current of the several motors, means for providing a speed signal n corresponding to motor speed for a non-slipping condition, a function generator responsive to the current signal programmed for producing an output signal representing $E/n$ where E is back emf of the motor, a second function generator responsive to the current signal for producing an output signal representing IR where R is the motor resistance, a multiplier circuit responsive to the $E/n$ signal and the speed signal for producing a signal proportional to E, means for combining the outputs of the second function generator and the multiplier circuit for producing a signal V representing the motor voltage for a non-slipping condition, means for increasing the V signal by a factor representing desired maximum percent slip to obtain a limit voltage, and means for limiting the maximum voltage supplied to the motors to the value of the limit voltage thereby establishing a maximum percent slip of wheels driven by the motors.

5. A wheel slip control for a locomotive having a power supply and several electrical traction motors driving wheels subject to slipping for limiting the maximum percent wheel slip comprising means for providing a current signal I corresponding to the lowest motor current of the several motors, means for providing a speed signal $n$ corresponding to motor speed for a non-slipping condition, a function generator responsive to the current signal programmed for producing an output signal representing $E/n$ where E is back emf of the motor, a second function generator responsive to the current signal for producing an output signal representing IR where R is the motor resistance, a multiplier circuit responsive to the $E/n$ signal and the speed signal for producing a signal proportional to E, means for combining the outputs of the second function generator and the multiplier circuit for producing a signal V representing the motor voltage for a non-slipping condition, means for increasing the V signal by a factor representing desired maximum percent slip to obtain a limit voltage, means for limiting the maximum voltage supplied to the motors to the value of the limit voltage thereby establishing a maximum percent slip of wheels driven by the motors, and a maximizing circuit responsive to combined motor current of the several motors for modifying the limit voltage to increase the combined motor current to substantially its maximum value within the limit of the desired maximum wheel slip.

* * * * *